Jan. 15, 1946.　　F. G. MANSON　　2,393,178
QUICK-RELEASE CONNECTOR
Filed July 5, 1943　　2 Sheets-Sheet 1

Inventor
Frank G. Manson
By Thiess, Olson + Mecklenburger
Attys.

Jan. 15, 1946.   F. G. MANSON   2,393,178
QUICK-RELEASE CONNECTOR
Filed July 5, 1943    2 Sheets-Sheet 2
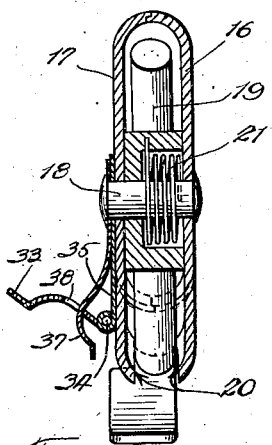
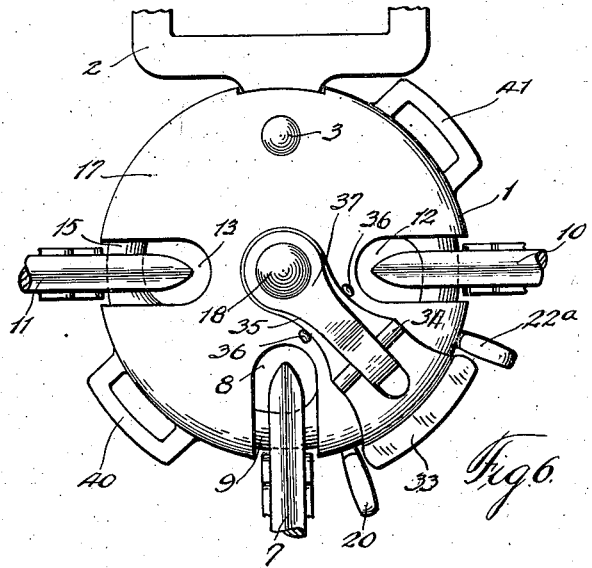
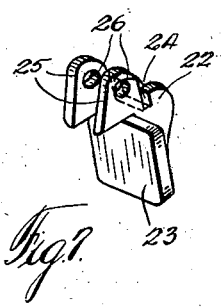
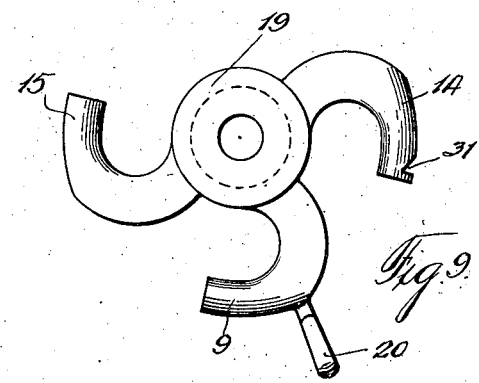
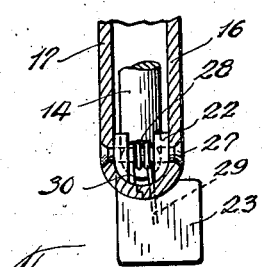
Inventor:
Frank G. Manson
By Thiess, Olsen & Mecklenburger
Attys.

Patented Jan. 15, 1946

2,393,178

UNITED STATES PATENT OFFICE 2,393,178

QUICK-RELEASE CONNECTOR

Frank G. Manson, Chicago, Ill.

Application July 5, 1943, Serial No. 493,565

18 Claims. (Cl. 24—205)

The present invention relates to an improvement in a quick-release mechanism or connector that may preferably be employed in connection with a parachute harness which supports the body of the wearer, such as a paratrooper, during a parachute descent. However, the quick-release connector of my invention may also be employed with any sort of harness that it is desired to release quickly from the object to which it is fitted, such as an aerial delivery container.

My quick-release connector is sturdy, compact in construction to make it as thin as possible, self-contained, foolproof in operation, and embodies safety features that preclude the inadvertent releasing of the harness until the connector is manually operated, whereupon the harness is promptly disengaged with the utmost speed. It can be appreciated readily that such quick-release connectors are extremely useful for parachute harnesses for airborne troops. In such an adaptation of my invention, it is of paramount importance that the quick-release connector possess the highest safety factor to insure that the harness will not be released until the paratrooper desires to extricate himself from the harness carrying the parachute, and that the connector instantly release the paratrooper with the simplest sort of manual operation. The same factors as to safety and prompt release are highly desirable in connection with harnesses that are employed for the aerial delivery of packages.

My present invention thus meets the above specifications, and for a better understanding of the nature, scope, and characteristic features of my quick-release connector, reference may be had to the following specification and drawings, wherein:

Figure 1 is a plan view of a quick-release connector embodying one form of my invention, which is shown as being employed in connection with a harness that is provided with four straps, one strap being permanently attached to the connector and three straps being provided with harness hooks that are inserted respectively in the three slots of my connector where each harness hook is firmly engaged. Two safety devices are shown in this form of my invention which serve to prevent the inadvertent release of the harness hooks.

Fig. 5 is a view, partially in elevation and partially in section, taken along the line 5—5 of Fig. 1, except that the other safety device secured to the front wall of the casing is shown in open position.

Fig. 6 is a plan view of a simplified form of my quick-release connector wherein the safety spring latch shown in Figs. 3 and 4 has been omitted. However, the disk-shaped casing is provided with fastening means, shown as being integrally formed, in order to secure the ends of a belt or similar device to the connector.

Fig. 7 is a perspective view of the safety spring latch, but omitting the associated spring.

Fig. 8 is a fragmentary view, partially in elevation and partially in section, taken along the line 8—8 of Fig. 3.

Fig. 9 is a plan view of the rotatable member that is housed in the casing showing the three hooking arms, one being notched to effect positive engagement of the safety spring latch, and the means exteriorly accessible of the casing for manually rotating the said member.

Figure 1:
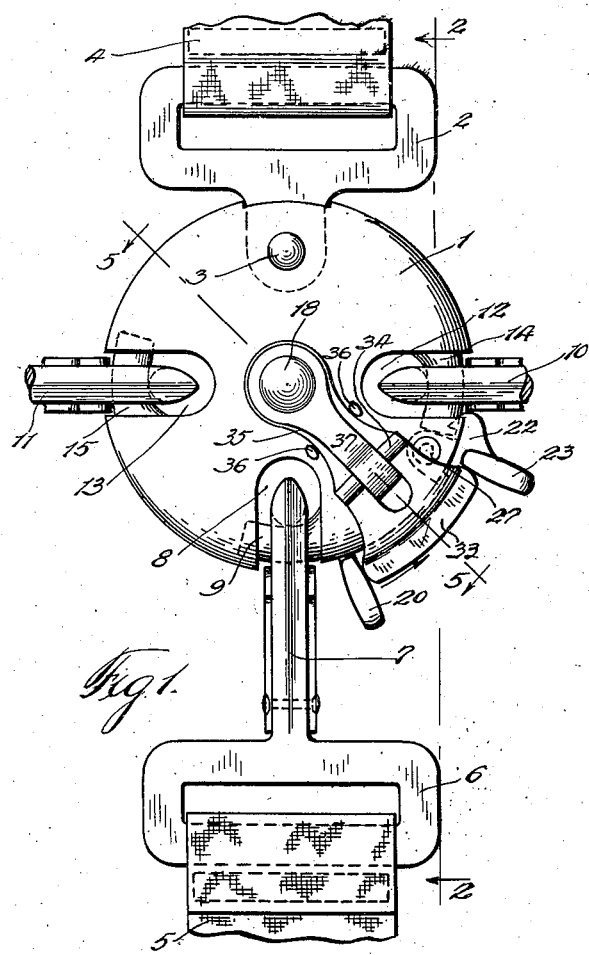

To exemplify one use of my invention, my quick-release connector may be employed in connection with the parachute harness illustrated and described in United States Patent No. 2,287,812, granted on June 30, 1942. In this patent the connector shown may simultaneously release all of the straps of the harness, or may be permanently attached to one of the straps of the harness so that the connector will always remain with the harness and be readily available for further use. My connector may likewise be attached permanently to one strap of the harness or may simultaneously release all of the associated straps of the harness, as desired. As shown in the drawings forming a part of this specification, I have elected to show my connector as being permanently attached to one strap of the harness.

In Fig. 1, my connector 1 is permanently attached to a buckle 2 that is pivotally but permanently secured at 3 to the connector. A strap 4 of the parachute harness is permanently sewn to the buckle 2. Another strap 5 of the parachute harness is permanently sewn to the buckle 6 which is formed integrally with a harness hook 7. The harness hook 7 is received in a slot 8 formed in the casing of the connector 1 and is engaged by a hooking arm 9 which will be described hereinafter. Similarly, harness hooks 10 and 11, likewise secured to straps of the parachute harness, are received in slots 12 and 13, respectively, also formed in the casing of the connector 1. The harness hooks 10 and 11 are engaged by hooking arms 14 and 15, respectively, which are similar to the hooking arm 9. The slots 8, 12, and 13 are peripherally spaced and are shown as being radially formed in the generally circular hollow disk-shaped casing of the connector 1.

Figure 3:
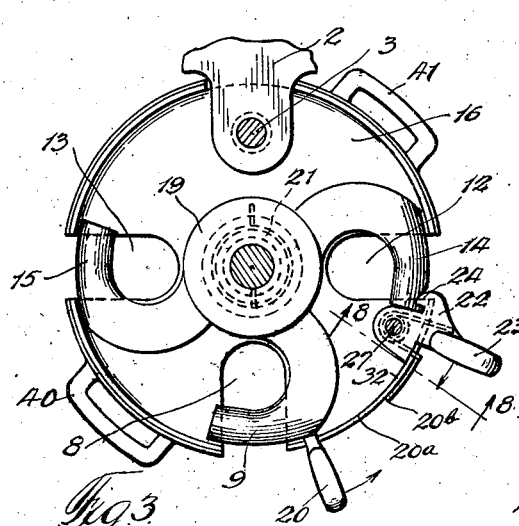
Fig. 3 is a plan view of the connector shown in Fig. 1 with the top cover of the hollow disk-shaped casing removed, showing the hooking arms in the positions they occupy when they engage the harness hooks. The safety spring latch secured to, and housed within, the casing is shown as positively engaging one of said hooking arms.
Figure 4:
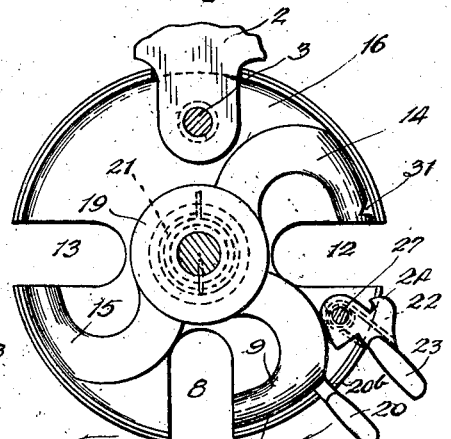
Fig. 4 is another plan view of the connector of Fig. 3, showing the hooking arms in the position they occupy when the harness hooks are simultaneously disengaged, which may occur when the said spring latch is released from engagement with one of the hooking arms.

The casing of the connector 1 is formed of two opposed dish-shaped members or plates 16 and 17, as shown in Fig. 5, which plates are held permanently in close engagement with each other by means of a rivet 18 that passes through the center of the plates 16 and 17. Thus the plates 16 and 17 form a hollow disk-shaped casing which is of minimum thickness. A rotatable member 19 is housed in the hollow casing and is pivotally mounted on the rivet 18 to permit rotation thereabout. The member 19 is particularly shown in Fig. 9 and comprises the hook-engaging arms 9, 14, and 15 that have been mentioned above in connection with Fig. 1. The member 19 is provided with an exteriorly accessible thumbpiece 20 integrally formed on the hook-engaging arm 9. This thumbpiece 20 projects outwardly from the hollow disk-shaped casing through an arcuate slot 20ª, as shown in Figs. 3, 4, and 5. The slot 20ª is formed by cutting away on corresponding arcs the upturned edges of the two opposed disk-shaped plates 16 and 17. As shown in Figs. 1, 3, 4, and 6, the hooking arms 9, 14, and 15 bridge the slots 8, 12, and 13, respectively, when the member 19 is rotated to the position shown in Fig. 3. In this position the harness hooks 7, 10, and 11 may be engaged, respectively, by the hooking arms 9, 14, and 15, as shown in Fig. 1. When the member 19 is rotated to the position shown in Fig. 4, the slots 8, 12, and 13 are open and then free to receive the harness hooks. Rotation of the member 19 is manually effected by the thumbpiece 20, which at its extreme position in counterclockwise direction abuts a shoulder 20ᵇ, as shown in Fig. 4.

Figure 2:
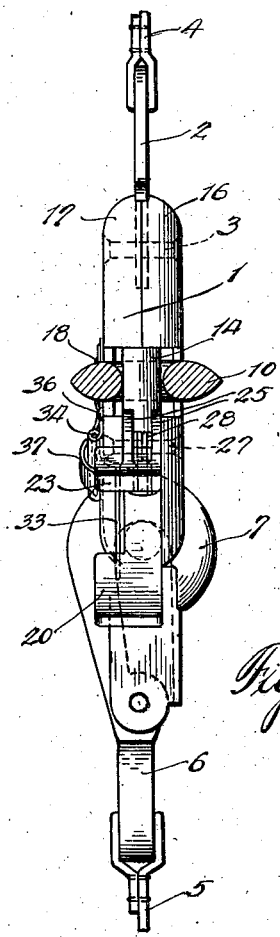
Fig. 2 is a view, partially in elevation and partially in section, taken along the line 2—2 of Fig. 1.

My connector, as shown in Figs. 1, 2, and 3, comprises two safety devices to prevent the inadvertent or unintentional release of the harness hooks therefrom, either safety device sufficing to lock the rotatable member 19 in hook-engaging position. One of the safety devices comprises the spring-pressed safety latch 22, which is shown in Figs. 1, 2, and 3, in latched position where it engages the hooking arm 14. The latch 22, omitting the spring and its pivot pin, is shown in perspective in Fig. 7. It comprises a thumbpiece 23, a hook portion 24, and two spaced arms 25 that are provided with aligned openings 26. The latch 22 is pivotally mounted adjacent to the slot 20ª upon the casing 1. This is effected by inserting a pin 27 through the openings 26 and riveting the ends of the pin, which project through the casing members 16 and 17, as shown in Fig. 8. A spiral spring 28 exerting a heavy tension embraces the pivot pin 27 and one end of the spring is permanently secured to the thumbpiece 23, as shown at 29, and the other end of the spring is permanently secured to the plate 17, as shown at 30. The action of this spring is such that the latch 22 is always biased in the position shown in Figs. 1 and 3. The hook portion 24 of the latch 22 is adapted to engage a notch 31 formed in the end of the hook-engaging arm 14 of the member 19, as shown in Fig. 9. The portions 25 of the latch 22, when the latch engages the arm 14, abut against the shoulder 32 (Fig. 3) formed by the upstanding and opposed segments of the dish-shaped plates 16 and 17 which remain after these plates have been recessed at 20ª and at a point on their periphery adjacent to where the latch 22 projects outwardly from the hollow casing. On manually pressing the thumbpiece 23 so as to rotate the latch 22 in a clockwise direction, the hook 24 of the latch is withdrawn from the recess 31 of the hook-engaging arm 14, and thereupon the rotatable member 19 can be moved to harness hook-disengaging position, as shown in Fig. 4. The harness hooks are thus simultaneously disengaged from the connector.

Another safety device forming a part of my connector comprises the hinged plate 33, shown particularly in Figs. 1 and 5, which, when in normal position, subtends and obstructs the arcuate passageway 20ª, thus preventing the thumbpiece 20 from rotating the member 19 in a counter-clockwise direction. The hinged plate 33, when in normal position, obstructs the inadvertent moving of the thumbpiece 20. The plate 33 is hinged at 34 to a flat member 35 that is permanently secured exteriorly of the outer plate 17 of the hollow casing by the rivet 18. The plate 35, and consequently the hinged plate 33, are held against arcuate movement by means of the upstanding lugs 36 formed in the plate 17 and positioned in contact with the plate 35. A flat leaf spring 37, likewise secured to the plate 17 by the rivet 18, extends over the plate 35, the hinge 34, and firmly presses down upon the hinged plate 33 when the latter is in normal position. The form of the leaf spring is shown best in Fig. 5. The plate 33 is provided with an opening 38 which allows the free end of the leaf spring 37 to project therethrough when the plate 33 is manually moved to the position shown in Fig. 5. When the operator desires to move the obstructing plate 33 from the path of the thumbpiece 20, the plate 33 is manually grasped and moved away from the casing 1 by rotating about the hinge 34. The leaf spring 37 is thus pressed upwardly away from the casing, and its free end then passes through the opening 38. The thumbpiece 20 and the thumbpiece 23 may then be grasped by the operator, whereupon the latch 22 releases its engagement with the hooking arm 14, and simultaneously the member 19 is rotated in a counter-clockwise direction thus releasing simultaneously the harness hooks from the hooking arms.

Because of the fact that the coiled spring 21 exerts a light torsional effect as compared to the friction of hook portion 24 against arm 14, the member 19 is rotated by the spring 21 only far enough to close the slots 13, but not enough to allow the hook 24 to enter the notch 31 and latch the member 19. Furthermore, with this arrangement, member 19 is unable to rotate freely but is subjected to a braking action by pressure of the hook 24 against its periphery thus insuring the action of spring 21 in maintaining engagement of the hooking arms 9, 14 and 15 with their respective harness hooks.

The boss or hub of the member 19 may be recessed at its center, as shown in Figs. 3, 4, 5, and 9, and the coil spring 21 may be housed in this recess. The ends of this spring are connected respectively to the member 19 and to the rivet 18, and this spring 21 normally biases the member 19 to bring the hook-engaging arms in such position as to bridge the slots 8, 12, and 13 formed in the casing of the connector. The coil spring 21 is optional inasmuch as the member 19 can be manually rotated. However, the coil spring 21 is an additional safety feature in that the harness hooks, when engaged by the hook-engaging arms, may be held in engagement with the connector in an emergency solely by the action of the coil spring 21. Because of the fact that the coil spring 21 exerts a light torsional force as compared to the friction of the hook 24 of the latch 22 against the arm 14, the member 19 is rotated by the spring 21 only far enough to close the slots 8, 12, and 13, but not enough to allow the hook 24 to enter the notch 31 and thereafter latch the member 19. Furthermore, by this arrangement the member 19 is unable to rotate freely but is subjected to a braking action by the pressure exerted against it by the hook 24, thus insuring that the action of the spring 21 will maintain engagement of the hooking arms 9, 14, and 15 with their respective harness hooks.

From the foregoing it will be apparent that the rotatable member 19 is locked in hook-engaging position by two safety devices, namely, the hinged plate 33, which obstructs movement of the member 19, and the spring safety latch 22, which is locked against pivotal movement by the obstructing hinged plate 33. The harness hooks may be released simultaneously when the hinged plate 33 is moved to the position shown in Fig. 5, whereupon the operator, by grasping the thumbpieces 20 and 23 and pressing them together, causes release of the member 19 and its hooking arms and the simultaneous disengagement of all of the harness hooks.

It is not necessary that both of these safety devices be employed, because the spring-pressed safety latch 22 may be dispensed with. Such a modified form of my connector is shown in Fig. 6. In this modification, the hinged plate 33, associated with its appurtenances 34, 35, 36, and 37, is the sole safety device affixed to the connector. The latch 22 has been eliminated and a thumbpiece 22a has been substituted therefor. The thumbpiece 22a may be integrally formed with the front plate 17 of the casing 1. In releasing the harness hooks in the connector shown in Fig. 6, the plate 33 is moved about its hinge 34 as hereinabove described, and the operator, by manually grasping the thumbpiece 20 and the stationary thumbpiece 22a, can then rotate the member 19, thus effecting disengagement between the hooking arms and their respective harness hooks. In this modification the casing of my connector is provided with fastening members or lugs 40 and 41 which allow the ends of a belt or similar article to be attached to the connector. If the paratrooper attaches his waist-belt to these members 40 and 41, the connector will be tied firmly in position on the body so that when the parachute opens and inflates, the connector and the parachute harness will be held in their initial positions and away from the face of the paratrooper. The permanently attached buckle 2 may be dispensed with under certain conditions and to modify my connector so as to engage any number of harness hooks or attaching means, all of which are simultaneously released in the manner hereinabove described in connection with the three harness hooks 7, 10, and 11, would not depart from my invention.

A suitable harness hook that may be advantageously employed in connection with my quick-release connector is shown in U. S. Patent No. 1,879,168.

It is obvious that the thumbpieces 20, 22a, and 23 are of suitable size so as to be readily and firmly grasped by a gloved hand. It is also obvious that the harness hooks 7, 10, and 11 may be substituted by other attaching means which the hooking arms of the connector may engage and disengage, as explained above in connection with the harness hooks. If the usual harness hooks are employed, it is also obvious that the hooking arms may be locked in closed position before the harness hooks are individually and separately snapped into position on my connector. It follows, of course, that such harness hooks may also be individually released from the connector when the hooking arms are in locked position. While the connector in Fig. 1 is shown as comprising three hooking arms to engage respectively three harness hooks or other attaching means, it is apparent that the connector may comprise a greater or a fewer number of hooking arms to engage a greater or a fewer number of harness hooks or other suitable attaching means. Therefore, when harness hooks are mentioned in the specification and the claims, it is to be understood that any suitable attaching means may be substituted for the harness hooks and that the connector is not limited to hold only three such attaching means.

While several modifications of my invention have been shown and described, it is to be understood that I desire only such limitations to be imposed upon my invention as are contained in the appended claims.

I claim:

1. An instantaneous-release connector for a harness comprising a disk-shaped hollow casing having a plurality of peripherally spaced openings formed therein, a rotatably mounted member housed in said casing and having a plurality of hooking arms that are adapted on rotation of said member to subtend said openings wherein harness attaching members may be received and engaged by said hooking arms, spring means intermediate said casing and said rotatably mounted member biasing the latter to hook-engaging position, means carried by said member for rotating said member to position said hooking arms transversely of said slots whereby the harness attaching members may be separately engaged, and means carried by said casing for locking said member against rotation when the said hooking arms are in engaging position, said two mentioned means being manually engageable for releasing said member and rotating the same in a single manual movement.

2. An instantaneous-release connector for a harness comprising a disk-shaped hollow casing having a plurality of peripherally spaced slots formed therein, a rotatably mounted member housed in said casing and having a plurality of hooking arms that are adapted on rotation of said member to subtend said slots wherein harness attaching members may be received and engaged by said hooking arms, means carried by said member for rotating said member to position said hooking arms transversely of said slots whereby the harness attaching members may be separately engaged, means carried by said casing for locking said member against rotation when the said hooking arms are in engaging position, and additional means carried by said casing and engaging said member when in harness engaging position for positively locking said member in engaging position, said additional means comprising a guard interposed between said rotatable member and said locking means both of said locking means on being moved to released position allowing said hooking arms to release simultaneously said harness attaching members from the connector.

3. An instantaneous-release connector for a harness comprising a disk-shaped hollow casing having a plurality of peripherally spaced slots formed therein, a rotatably mounted member housed in said casing and having a plurality of hooking arms that are adapted on rotation of said member to subtend said slots wherein harness attaching means may be received and engaged by said hooking arms, means carried by said member for rotating said member to position said hooking arms transversely of said slots whereby the harness attaching means may be separately engaged, means carried by said casing for locking said member against rotation when the said hooking arms are in engaging position, and a spring-pressed latch secured to said casing for positively engaging said member and locking it when in engaging position, said latch and member each including a finger-operated portion whereby finger pressure exerted upon said portions simultaneously releases the said latch and moves said member to release all of said harness attaching means.

4. An instantaneous-release connector for a harness comprising a disk-shaped hollow casing having a plurality of peripherally spaced slots formed therein, a rotatably mounted member housed in said casing and having a plurality of hooking arms that are adapted on rotation of said member to subtend said slots wherein harness hooks may be received and engaged by said hooking arms, a handle secured to said member and projecting radially through a peripheral slot in said casing for rotating the said member, and a spring-pressed latch projecting radially from said casing and pivoted to said casing adjacent to said handle for positively engaging said member to lock it in hook-engaging position when said member is rotated by said handle to hook-engaging position, said handle and said latch when being manually pressed toward each other serving to move said rotatably mounted member to hook-disengaging position.

5. An instantaneous-release connector for a harness comprising a disk-shaped hollow casing having a plurality of peripherally spaced slots formed therein, a rotatably mounted member housed in said casing and having a plurality of hooking arms that are adapted on rotation of said member to subtend said slots wherein harness hooks may be received and engaged by said hooking arms, a handle secured to said member for rotating the same, and a spring-pressed latch secured to said casing for positively engaging said member to lock it in hook-engaging position when said member is rotated by said handle to hook-engaging position, said spring-pressed latch being provided with a handle for releasing the said member whereby it may be moved to hook-releasing position, and a safety device to prevent inadvertent release of said latch comprising a guard adapted to be positioned between said handles.

6. An instantaneous-release connector for a harness comprising a disk-shaped follow casing having a plurality of peripherally spaced slots formed therein, a rotatably mounted member housed in said casing and having a plurality of hooking arms that are adapted on rotation of said member to subtend said slots wherein harness hooks may be received and engaged by said hooking arms, a finger-pad secured to said member for rotating the same, means for locking said member against rotation when in hook-engaging position, and a spring-pressed latch secured to said casing for positively engaging said member to lock it in hook-engaging position when said member is rotated by said finger-pad to hook-engaging position, a finger-pad secured to said latch and adjacent said first mentioned finger-pad whereby finger pressure on said pads simultaneously releases said latch and rotates said member to hook-releasing position.

7. An instantaneous-release connector for a harness comprising a disk-shaped hollow casing having a plurality of peripherally spaced openings formed therein, a rotatably mounted member housed in said casing and having a plurality of hooking arms that are adapted on rotation of said member to subtend said openings wherein harness hooks may be received and engaged by said hooking arms, means carried by said member for rotating said member to position said hooking arms transversely of said slots, means carried by said casing for locking said member against rotation when in hook-engaging position, and additional means carried by said casing and comprising a spring-pressed latch for positively engaging at least one of said hooking arms when in hook-engaging position to lock said member against rotation, two of the said means each including a finger-pad, said finger-pads being in closely adjacent relationship to each other whereby finger pressure thereon simultaneously releases said latch and exerts pressure on said member tending to rotate the latter to hook-releasing position.

8. An instantaneous-release connector for a harness comprising a disk-shaped hollow casing having a plurality of peripherally spaced openings formed therein, a rotatably mounted member housed in said casing and having a plurality of hooking arms that are adapted on rotation of said member to subtend said openings wherein harness hooks may be received and engaged by said hooking arms, means carried by said member for rotating said member to position said hooking arms transversely of said openings, a spring-pressed guard secured to said casing for locking said member against rotation when in hook-engaging position, and additional means carried by said casing and comprising a spring-pressed latch for positively engaging at least one of said hooking arms when in hook-engaging position for locking said member against rotation.

9. An instantaneous-release connector for a harness comprising a disk-shaped hollow casing having a plurality of peripherally spaced openings formed therein, a rotatably mounted member provided with a handle and housed in said casing and having a plurality of hooking arms that are adapted on rotation of said member to subtend said openings wherein harness-attaching means may be received and engaged by said hooking arms, said handle being utilized for rotating said member to position said hooking arms transversely of said openings, a spring-pressed guard secured to said casing for locking said member against rotation when in hook-engaging position, and a spring-pressed latch provided with a handle and secured to said casing and positively engaging said member when the hooking arms are in hook-engaging position for locking said member against rotation, both of said handles coactable under finger pressure to rotate said member whereby said attaching means are simultaneously released from the connector after said spring-pressed guard is actuated to free said member.

10. An instantaneous-release connector for a harness comprising a flat, disk-shaped, hollow casing having a plurality of peripherally spaced radial slots formed correspondingly in the walls thereof, a rotatably mounted member housed in said casing and having a plurality of hooking arms that are adapted on rotation of said member to subtend said slots wherein harness hooks may be received and severally engaged by said hooking arms, means connected with said member and comprising a manually operable pad for rotating said hooking arms transversely of said slots, a spring-pressed latch secured to said casing that positively engages said member to lock it when rotated to hook-engaging position, and additional means comprising a spring-pressed guard secured to said casing for locking said member in hook-engaging position.

11. An instantaneous-release connector for a harness comprising a flat, disk-shaped, hollow casing having a plurality of peripherally spaced radial slots formed correspondingly in the walls thereof, a rotatably mounted member housed in said casing and having a plurality of hooking arms that are adapted on rotation of said member to subtend said slots wherein harness hooks may be received and severally engaged by said hooking arms, means connected with said member for rotating said hooking arms transversely of said slots, spring means biasing said member to hook-engaging position, a spring-pressed latch secured to said casing that positively engages said member to lock it when rotated to hook-engaging position, and additional means secured to said casing for locking said member in hook-engaging position.

12. An instantaneous-release connector for a harness comprising a flat, disk-shaped, hollow casing having a plurality of peripherally spaced radial slots formed correspondingly in the walls thereof, a rotatably mounted member housed in said casing and having a plurality of hooking arms that are adapted on rotation of said member to subtend said slots wherein harness hooks may be received and severally engaged by said hooking arms, means connected with said member for rotating said hooking arms transversely of said slots, spring means intermediate said member and casing biasing said member to hook-engaging position, a spring-pressed latch secured to said casing that positively engages said member to lock it when rotated to hook-engaging position, and additional means secured to said casing for locking said member in hook-engaging position, said spring-biasing means being insufficient to actuate said spring-pressed latch to lock said member in hook-engaging position.

13. An instantaneous-release connector for a harness comprising a disk-shaped hollow casing having a plurality of peripherally-spaced slots formed correspondingly in the walls of the casing, a member housed in said casing and rotatably mounted at the central portion thereof, said member being provided with a plurality of hooking arms that in open position permit harness hooks to be inserted in said slots and in closed position bridge said slots to engage said harness hooks, means carried by said member and exteriorly of said casing for rotating said member, a manually operated latch carried by said casing which in one position locks said rotatable member in hook-engaging position and in another position allows said rotatable means to rotate thereby simultaneously disengaging said hooking arms from engagement with the harness hooks, and a guard to prevent inadvertent operation of said latch comprising a hinged member movable into and out of guarding position and positively held in either of said positions by a detent.

14. An instantaneous-release connector for a harness comprising a disk-shaped hollow casing having a plurality of peripherally spaced slots formed therein, a rotatably mounted member housed in said casing and having a plurality of hooking arms that are adapted on rotation of said member to subtend said slots wherein harness hooks may be received and engaged by said hooking arms, means carried by said member for rotating said member to position said hooking arms transversely of said slots whereby the harness hooks may be separately engaged, means carried by said casing for locking said member against rotation when the said hooking arms are in hook-engaging position, additional means carried by said casing engaging said member when in hook-engaging position for positively locking the latter in hook-engaging position, and spring means intermediate said member and casing for biasing said member in the direction of hook-engaging position.

15. An instantaneous-release connector for a harness comprising a disk-shaped hollow casing having a plurality of peripherally spaced slots formed correspondingly in the walls of the casing, a member housed in said casing and rotatably mounted at the central portion thereof, said member being provided with a plurality of hooking arms that in open position permit harness hooks to be inserted in said slots and in closed position bridge said slots to engage said harness hooks, means carried by said member exteriorly of said casing for rotating said member, manually operated means carried by said casing which in one position locks said rotatable member in hook-engaging position and in another position allows said rotatable means to rotate thereby simultaneously disengaging said hooking arms from engagement with the harness hooks, and means intermediate said member and casing automatically biasing said rotatable member in the position where said hooking arms bridge said slots.

16. An instantaneous-release connector for a harness comprising a disk-shaped hollow casing having a plurality of peripherally spaced slots formed correspondingly in the flat walls of the casing, a member housed in said casing and rotatably mounted at the central portion thereof, said member being provided with a plurality of hooking arms that in open position permit harness hooks to be inserted in said slots and in closed position bridge said slots to engage said harness hooks, means carried by said member and exteriorly accessible of said casing for rotating said member, manually operated means carried by said casing which in one position locks said rotatable member in hook-engaging position and in another position allows said rotatable means to rotate thereby simultaneously disengaging said hooking arms from engagement with the harness hooks, a spring-pressed latch secured to said casing for positively locking said member in hook-engaging position, and spring means intermediate said member and casing automatically biasing said rotatable member in the position where said hooking arms bridge said slots without effecting locking engagement between said latch and said rotatable member.

17. An instantaneous-release connector for a harness comprising a disk-shaped hollow casing having a plurality of peripherally spaced slots formed correspondingly in the walls of the casing, a member housed in said casing and rotatably mounted at the central portion thereof, said member being provided with a plurality of hooking arms that in closed position bridge said slots to engage harness-attaching means, means exteriorly accessible of said casing for rotating said member, manually operated means which in one position locks said rotatable member in closed position and in another position allows said rotatable means to rotate thereby simultaneously disengaging said hooking arms from engagement with the attaching means, a spring-pressed latch secured to and housed within said casing for positively locking said member in closed position, said latch having an exteriorly accessible handle for disengaging said latch from said member, spring means intermediate said casing and member and housed in said casing for biasing said rotatable member in closed position where said hooking arms bridge said slots without effecting locking engagement between said latch and said rotatable member, said latch being adapted to provide a braking action on said member upon biasing action of said spring means.

18. An instantaneous-release connector for a harness comprising a support having a plurality of openings therein; a member mounted on said support movable with respect thereto and having a plurality of hooking arms adapted on movement of said member to subtend said openings wherein harness-attaching members may be received and engaged by said hooking arms; means associated with said member to position said arms in subtending position whereby the attaching members may be severally engaged; and means comprising a latch engageable with said member to prevent unintentional movement of said arms when said arms are in engaging position; said latch and member each including a digitately-operated portion whereby digital pressure exerted upon said portions simultaneously releases said latch and moves said member to release all of said attaching members.

FRANK G. MANSON.